United States Patent
Wang (10) Patent No.: US 11,099,700 B1
(45) Date of Patent: Aug. 24, 2021

(54) MULTI-MODE OPERATION METHOD FOR CAPACITIVE TOUCH PANEL

(71) Applicant: Hycon Technology Corp., Taipei (TW)

(72) Inventor: Yu-Jen Wang, Taipei (TW)

(73) Assignee: Hycon Technology Corp., Taipei (TW)

( * ) Notice: Subject to any disclaimer, the term of this patent is extended or adjusted under 35 U.S.C. 154(b) by 10 days.

(21) Appl. No.: 16/835,401

(22) Filed: Mar. 31, 2020

(51) Int. Cl.
   *G06F 3/041*   (2006.01)
   *G06F 3/044*   (2006.01)

(52) U.S. Cl.
   CPC ...... *G06F 3/0447* (2019.05); *G06F 3/041661* (2019.05); *G06F 2203/04104* (2013.01)

(58) Field of Classification Search
   CPC ............. G06F 3/0447; G06F 3/041661; G06F 2203/04104
   See application file for complete search history.

(56) References Cited

U.S. PATENT DOCUMENTS

| | | | |
|---|---|---|---|
| 10,824,270 B1* | 11/2020 | Wang | G06F 3/044 |
| 2020/0183521 A1* | 6/2020 | Mayumi | G06F 3/047 |
| 2020/0371661 A1* | 11/2020 | Hung | G06F 3/04186 |

* cited by examiner

*Primary Examiner* — Afroza Chowdhury
(74) *Attorney, Agent, or Firm* — Demian K. Jackson; Jackson IPG PLLC (57) ABSTRACT

A multi-mode operation method for a capacitive touch panel is disclosed. The panel has a plurality of touch cells, and detection values of the plurality of touch cells are obtained by mutual capacitance scan. A normal mode and an insulation mode are provided for situations in which the panel is touched by a finger and a glove, respectively. An insulation determination condition is established for automatically determining glove touch to make the panel enter the insulation mode. In the insulation mode, the criteria for determining touch events can be automatically adjusted, or the detection values around the cells touched can be processed to accurately determine the touch effect when the panel is touched by a glove. In the insulation mode, a condition for determining to leave the insulation mode is also established, so that the touch panel can be smoothly switched between the normal mode and the insulation mode.

18 Claims, 9 Drawing Sheets

Fig. 1

Fig. 2A detection values by finger touch

Fig. 2B detection values by glove touch

MULTI-MODE OPERATION METHOD FOR CAPACITIVE TOUCH PANEL

FIELD OF THE INVENTION

The present invention relates to a multi-mode operation method for a capacitive touch panel. More specifically, the present invention relates to an operation method having a waterproof mode and an insulation mode for a capacitive touch panel using a mutual capacitance scan.

BACKGROUND OF THE INVENTION

Capacitive touch panels have been widely used in various types of electronic or computing devices, especially electronic devices such as mobile phones, tablet computers, and laptop computers. Capacitive touch panels often face extremely different operation environments. For example, in an outdoor low-temperature environment, a user may operate a touch panel while wearing a glove, and thus a distance between the finger and the touch panel is formed because of the thickness of the glove. Therefore, sensitivity of the touch panel must be improved in order for the touch panel to be operated like a finger touch. To solve the problems arising from wearing gloves, according to Taiwan Patent No. 511012, lower criteria for determining insulation touch are set and signal values of adjacent cells are also considered. Since gloves are made from non-conductive insulating materials, touch to a touch panel by a finger through an insulating object such as glove is called insulation touch.

In U.S. Pat. No. 9,778,742, different sensitivity parameters are set to scan sense signal values of a touch panel. When sensitivity is increased and multiple data consecutively exceed the touch criteria for glove mode, the touch panel would enter the glove operation mode, also known as insulation mode. It means that a user is wearing a glove to touch the panel. The problem with the above prior arts is that if a water droplet is present on a touch panel, even though a user does not wear a glove, it may be misguided to enter the insulation mode because of the increased sensitivity. For example, if a touch panel is exposed to rain or wiped with a wet tissue, since water has a certain conductivity, the sense signal values will be changed and the touch panel might erroneously enter the glove mode because of water.

Therefore, there is a need for an improved method for correctly determining whether a touch effect is caused by a glove, in order to enter the insulation mode, or water is present on a touch panel, in order to go to a waterproof mode. That is, a multi-mode operation method for a capacitive touch panel, which can avoid erroneous reporting caused by water and correctly recognize the effect of finger touch, is required.

SUMMARY OF THE INVENTION

The present invention discloses a multi-mode operation method for a capacitive touch panel which can correctly recognize various touch effects in multiple modes.

According to the present invention, A multi-mode operation method for a capacitive touch panel having a plurality of touch cells for obtaining a detection value from each of the plurality of touch cells in a mutual capacitance scanning manner, in which the panel is provided with a normal mode and an insulation mode, comprises the steps of: a) determining whether all detection values of the plurality of touch cells are less than a normal touch threshold; b) determining whether there is a touch cell with detection value greater than an insulation touch threshold; if positive, the insulation touch threshold being used as an effective touch standard value; otherwise, the detection values being enhanced to determine whether there is a touch cell with detection value larger than the normal touch threshold; if positive, the normal touch threshold being used as the effective touch standard value; determining whether detection values of upper, lower, left, and right cells adjacent to the touch cell are less than the detection value of the touch cell; and an insulated touch point being formed; c) determining whether the insulation touch point exists for a while and moves a distance greater than a predetermined distance, or whether the insulation touch point does not move but disappears in a short time and another insulation touch point appears near the disappeared insulation touch point; and d) entering the insulation mode.

According to the present invention, all touch cells can have an insulation touch point at most or the detection values of all touch cells cannot be less than a lower threshold.

According to the present invention, step c) of the method further comprises step c1) of restricting moving track of the insulation touch point to be a back and forth movement or a polygonal track when the moving distance of the insulation touch point is determined to be greater than the predetermined distance or not.

According to the present invention, the method further comprises steps of: e) obtaining detection value of each of the plurality of cells during panel initialization as a reference value; and f) subtracting the reference value from a subsequently obtained detection value for each of the plurality of cells as a new detection value before step a) is performed.

According to the present invention, the method further comprise steps of: g) setting a stable range for the new detection value; and h) subtracting a compensation value from the new detection value and adding the compensation value to the reference value if the new detection value is higher than an upper limit of the stable range when there is no touch event, or adding the compensation value to the new detection value and subtracting the compensation value from the reference value if the new detection value is lower than a lower limit of the stable range.

According to the present invention, the method further comprises step of i) ignoring step h) if there is an insulation touch point.

According to the present invention, in the insulation mode, the detection values are enhanced and effective touch is determined based on the normal touch threshold as the effective touch standard value, or effective touch is determined directly based on the insulation touch threshold as the effective touch standard value. When whether a cell at an edge of the touch panel is effectively touched is determined, detection value of the cell at the edge can be enhanced, or the effective touch standard value can be reduced for determining effective touch. Whether a cell with detection value greater than the effective touch standard value is effectively touched can be determined based on detection values of adjacent upper, lower, left, and right cells.

According to the present invention, the method further comprises step j) of locating an area where detection values are greater than a detection range standard value based on cells with detection values greater than the effective touch standard value after an effective touch point is determined in the insulation mode, and calculating touch coordinates based on the detection values in the area.

According to the present invention, the method further comprises step k) of stabilizing the coordinates by filtering, averaging, stable processing, or deceleration.

According to the present invention, the method further comprises step l) of returning to the normal mode from the insulation mode after a period of holding time without any touch event.

According to the present invention, the method further comprises step m) of leaving the insulation mode if any one of the detection values of the plurality of touch cells is greater than a normal detection standard value.

According to the present invention, the method further comprises step n) of entering the insulation mode directly without repeating steps a) to c) when the touch event disappears or the detection values of the plurality of touch cells are less than an insulation restoration standard value if the insulation mode is left.

According to the present invention, the touch panel is further provided with other modes and the touch panel enters the insulation mode or the other modes from the normal mode based on steps a) to c) or other conditions for the other modes.

According to the present invention, the touch panel has an insulation switch. When the insulation switch is turned off, the touch panel is restricted to the normal mode or the other modes. When the insulation switch is turned on, the touch panel can enter the normal mode, the insulation mode or the other modes, or is restricted to only the normal mode or the insulation mode. When the touch panel is restricted to only the normal mode or the insulation mode, steps a) to c) mentioned above are omitted.

According to the present invention, the other modes comprise a waterproof mode and a water mode; the touch panel can enter the insulation mode, the waterproof mode, or the water mode from the normal mode; the touch panel can enter the water mode from the insulation mode or the waterproof mode; and the touch panel is limited to entering the waterproof mode from the water mode.

According to the present invention, a calculation apparatus comprises a central processing unit; a touch panel for allowing a user to touch; and a controller, in communication with the touch panel and the central processing unit, for determining a touch effect based on touch detection values; wherein the central processing unit and the controller collaboratively operate to perform the method of the present invention.

According to the present invention, in comparison with the prior arts, it has better touch reorganization for determining touch effects caused by finger touch, glove touch and water adhesion.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
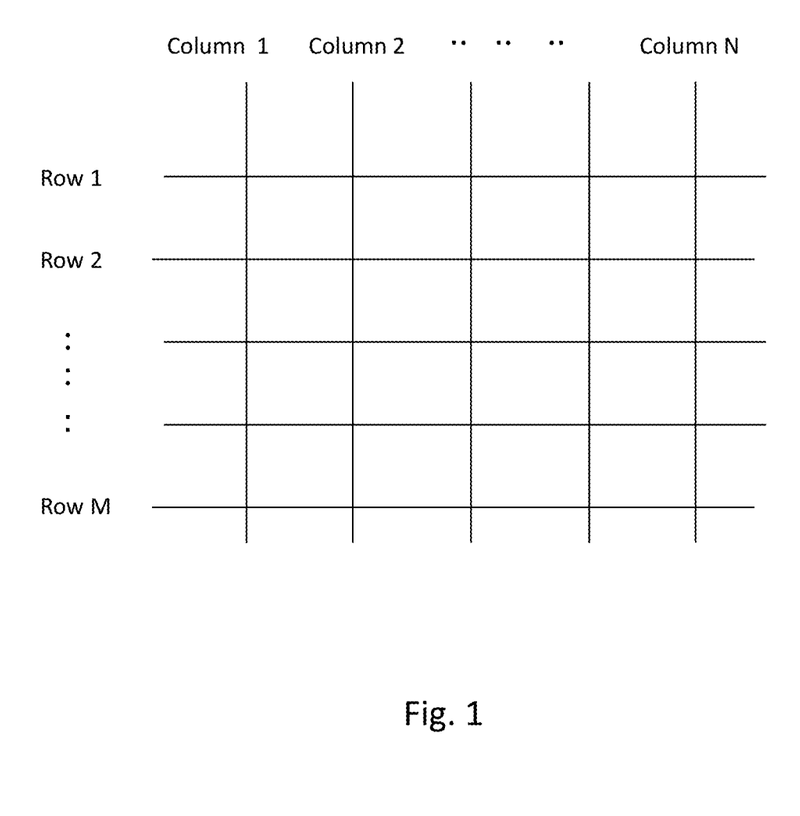
FIG. 1 is a view showing a mutual capacitive touch panel.

To facilitate understanding of the spirit and principles of the present invention, the arrangement and detection manner of the capacitive touch panel will be briefly described. Referring to FIG. 1, a touch panel 100 is provided with scan lines of N rows and M columns. Hereinafter, an area surrounded by two adjacent rows and two adjacent columns is referred to as a cell, and the entire touch panel is referred to as a frame. In general, a capacitive touch panel generates an induced electric field on a surface of the panel to obtain an equivalent capacitance value. When the panel is touched by a finger, the intensity of the induced electric field changes and the equivalent capacitance value also changes. Generally, the magnitude of the change is in the order of pF ($10^{-12}$ Farad), a signal thus obtained is converted into a digital signal by a device such as an analog-to-digital converter, and subjected to other processing to generate a corresponding value for performing different processes or operations. In general, there are two main scanning modes for scanning a touch panel to obtain the detection value. One is self-capacitance scanning and the other is mutual capacitance scanning. The present invention mainly uses mutual capacitance scanning to obtain detection values.

Figure 2A:
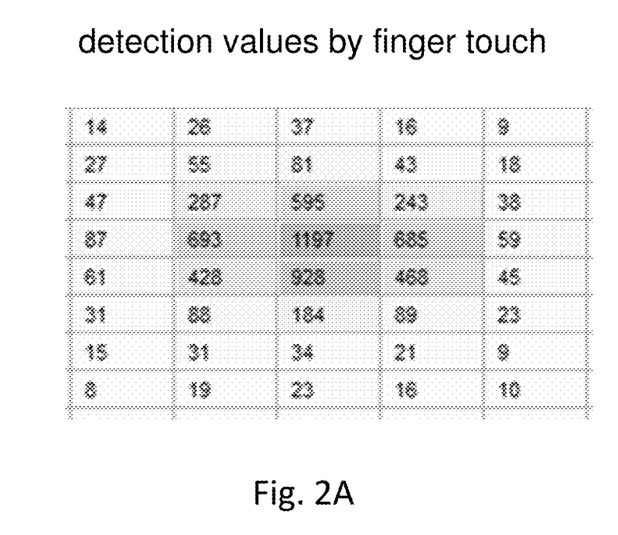
FIG. 2A and FIG. 2B show detection values of touch cells when a panel is touched by a finger and detection values of the touch cells when center of the panel is touched by a glove, respectively.

Herein, the capacitive detection values of the capacitive touch cells are changed along with different environmental conditions such as foreign object touch or adhesion. The initial data obtained without being touched or contacted by foreign objects is referred to as a reference value. An initial value is obtained when the capacitive touch panel is touched by a finger. The initial value minus the reference value is equal to a differential value, which stands for a change amount generated by the finger touch; that is, the differential value=the initial value−the reference value. For example, FIG. 2A shows change amounts of the touch cells touched by a finger in a normal condition. Namely, all the values shown in the drawing are differential values. As shown in FIG. 2A, the cell with value of 1197 and its surrounding cells have values significantly larger than those of other touch cells and are therefore considered to be touched by a finger. Hereafter, the change amount is called detection value.

Figure 2B:
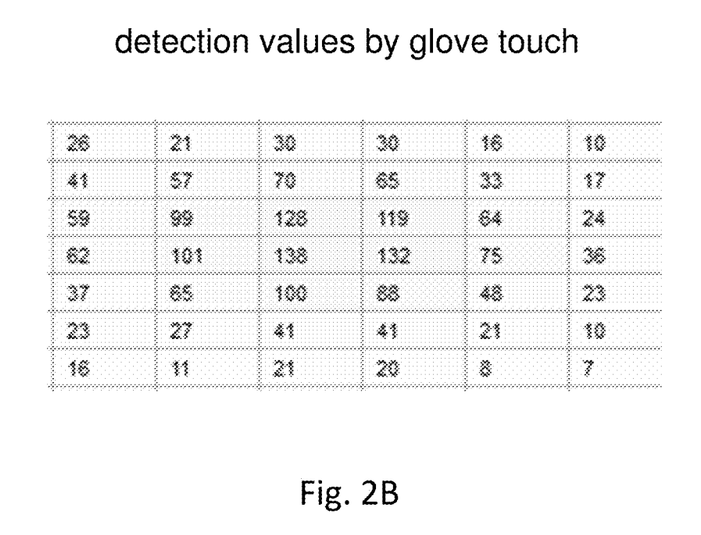

FIG. 2B shows detection values of the cells touched with a glove having a thickness of 3 mm thick. Compared with direct touch by a finger, in the case of glove touch, a distance between the finger and the touch panel is increased by the thickness of the glove, and the strength of the induced electric field is inversely proportional to the distance. Thus, the detection values for glove touch will be smaller than the detection values for direct finger touch. The maximum detection value in FIG. 2B is only 138, which is much lower than the maximum detection value 1197 for finger touch shown in FIG. 2A. If the detection values for finger touch are always used as determination references, then the detection values for glove touch are too small to recognize. If the detection values for glove touch are always used as determination references, then the detection values for finger touch are too large and the sensitivity is too high. A touch event would occur when a finger is close to but does not contact with the touch panel. Besides, misjudge is readily caused by noise interference. Therefore, the present invention designs two operation modes for the touch panel, i.e., normal mode for finger touch and insulation mode for glove touch. In these two modes, touch determination standards are different to avoid the problems caused by excessively high or low sensitivity.

Figure 3:
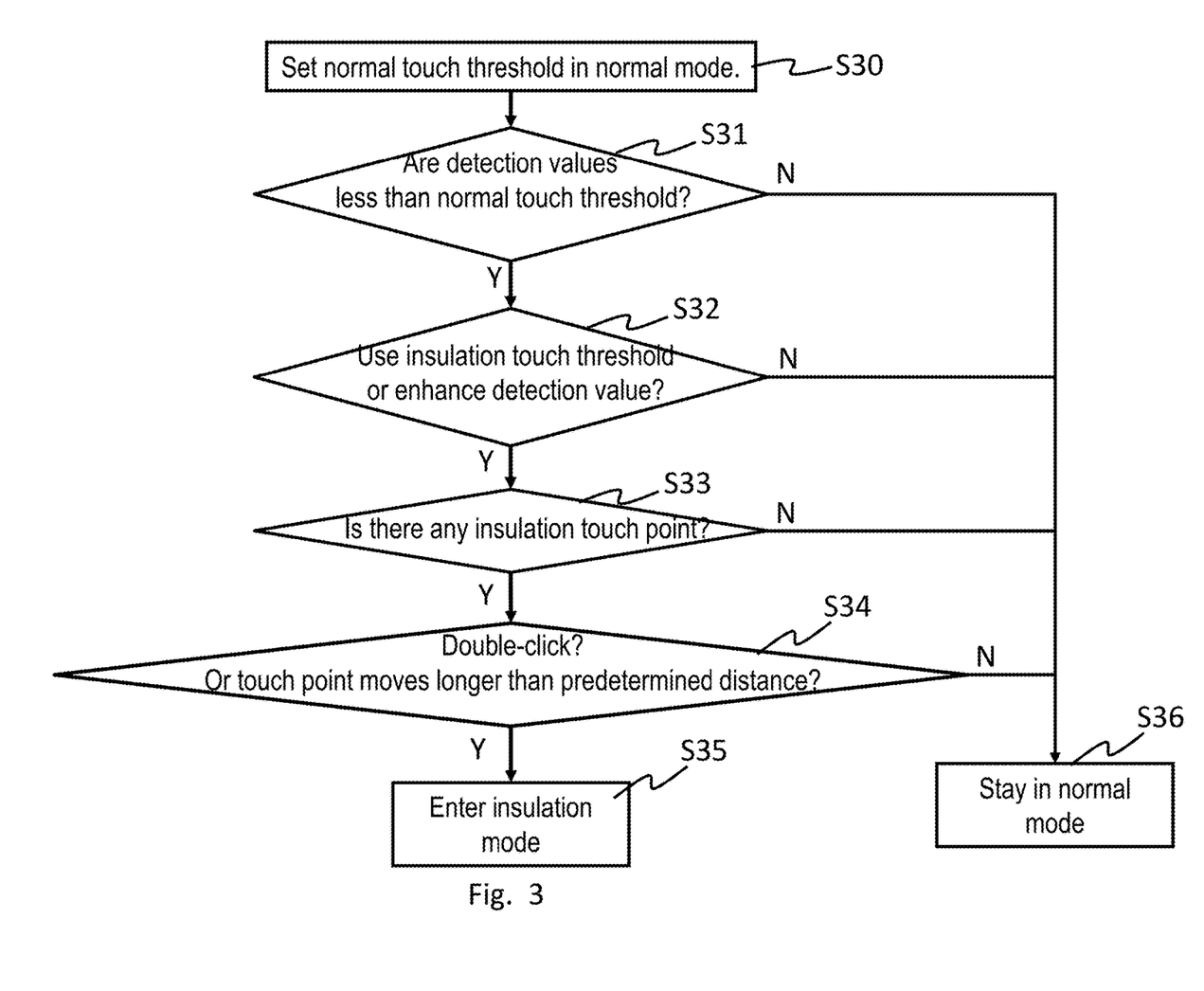
FIG. 3 is a flowchart illustrating how to determine insulation mode according to a first embodiment of the present invention.

FIG. 3 is a flowchart illustrating how to determine insulation mode according to a first embodiment of the present invention. In a normal mode, the maximum detection value of 1197 shown in FIG. 2A is used as a reference, and a normal touch threshold is set to 400 for determining finger touch in step S30. Step S31 is directed to a first determination for glove touch whether all of the detection values of the touch cells are less than the normal touch threshold (400 in this embodiment). If NO in step S31, then the flow goes to step S36. Otherwise, the flow goes to step S32 for a second determination whether there is any touch cell having a detection value greater than an insulation touch threshold or whether there is any touch cell with an enhanced detection value greater than the normal touch threshold. In step S32, the maximum detection value of 138 is used as reference for glove touch in FIG. 2B, the insulation touch threshold is set to 90, which is used as the effective touch standard value for determining glove touch. Alternatively, the detection values are multiplied by a fixed factor (such as 10, in view of difference between the maximum detection value of 138 for glove touch and the maximum detection value of 1197 for finger touch). If there is any touch cell with multiplied detection value greater than the normal touch threshold, the normal touch threshold is used as effective touch standard value for determining glove touch. When there is a touch cell with a detection value greater than the effective touch standard value, it is determined whether detection values of upper, lower, left, and right cells adjacent to the touch cell are less than the detection value of the touch cell. If all the requirements mentioned above are met, it is determined that an insulation touch point is formed in step S33. Otherwise, the flow goes to step S36 and the touch panel stays in the normal mode.

However, if only the above two requirements are used to determined glove touch and the insulation mode, misjudgment would readily arise. For example, if a finger is a little away from the touch panel, causing small changes in the detection values, the touch panel may enter the insulation mode. The touch panel may also enter the insulation mode when it is interfered by noises. Therefore, a third determination requirement is further utilized in step S34 for the following two cases. Case 1 is that the insulation touch point exists for a while and moves a distance greater than a predetermined distance. Case 2 is that the insulation touch point does not move but disappears in a short time and another insulation touch point appears near the disappeared insulation touch point. The third determination requirement is met as long as either Case 1 or Case 2 is satisfied. Case 1 and Case 2 are hardly possible to occur at the same time. Therefore, either Case 1 or Case 2 is determined, or both Cases are determined. After either Case is determined, the touch panel enters the insulation mode in step S35.

In step S34, for glove touch, the touch panel needs the user to slide the glove for a predetermined distance to confirm glove touch, so as to avoid entering the insulation mode due to noise interference. The predetermined distance does not need to be precise, and it can be a span of, for example, 6 touch cells. As to the description of Case 2 that the insulation touch point does not move but disappears in a short time and another insulation touch point appears near the disappeared insulation touch point, it represents double-click. The "short time" can be set to less than 1 second. Touching the touch panel and pressing it again within 1 second is regarded as double-click. As for the description of "near the disappeared insulation touch point", it represents that positions of the two clicks are on the same cell, or one or two cells away. When Case 2 is used, a tolerance of at least one cell is needed, because if the first click happens to be between two adjacent cells, position of the second click offset from the first position is hard to be determined.

Figure 4:
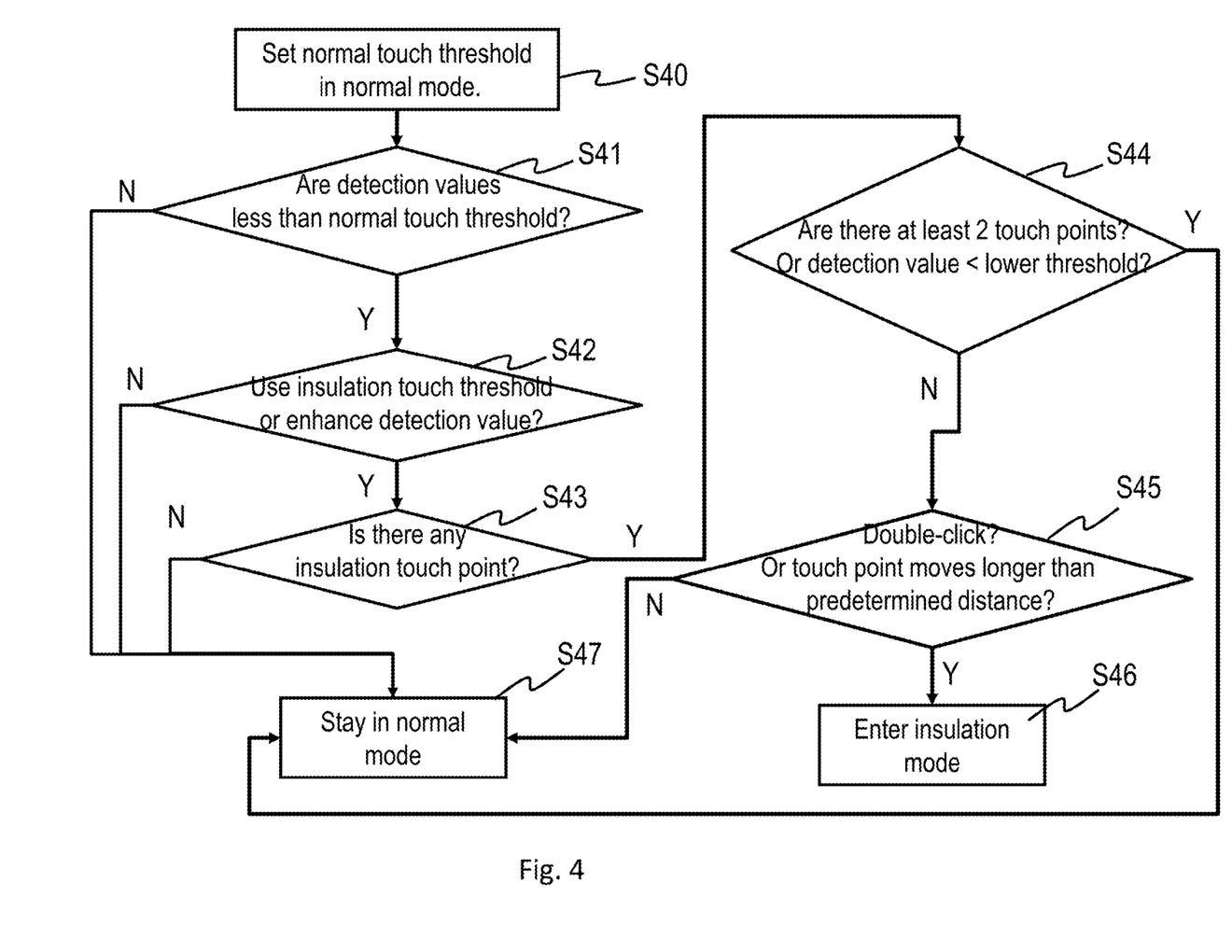
FIG. 4 is a flowchart illustrating how to determine insulation mode according to a second embodiment of the present invention.

A second embodiment according to the present invention is substantially the same as the first embodiment mentioned above except that all touch cells can have an insulation touch point at most or the detection values of all touch cells cannot be less than a lower threshold. FIG. 2 is a flowchart illustrating the second embodiment, where step S44 is incorporated. If two fingers touch the touch panel with a glove in the normal mode and two insulation touch points are generated, the insulation determination requirement is not met, and the panel will not enter the insulation mode. In addition, if the touch panel is exposed to water or is interfered by noises and generates negative detection values, it will not enter the insulation mode. Then the flow proceeds to step S47, and the touch panel stays in the normal mode. The lower threshold depends on the characteristics of the touch panel and the magnitudes of the noises. For example, when the touch panel is subject to general noise interference without any touch, the detection values will vary between 20 and −20. Thus, the lower threshold can be set to −40, and there is still a chance to meet the insulation determination requirement under normal conditions. If the touch panel is exposed to abnormal interference such as water, the minimum detection value lower than −40 can prevent it from meeting the insulation determination requirement.

According to the second embodiment mentioned above, for Case 1 where the insulation touch point exists for a while and moves a distance greater than a predetermined distance, it is required that the moving track of the insulation touch point is a back and forth movement or a polygonal track. If only the moving distance is used for determination, when there is a drop of water sliding on the panel or the panel is wiped with a wet tissue, an erroneous determination might be made because the insulation determination requirement may be met. Therefore, the moving track of the insulation touch point is further limited. The description of "back and forth movement" does not need to precisely return to the starting point of the original touch. For example, going a distance of 5 touch cells and returning a distance of at least 3 touch cells can be regarded as "back and forth movement". This concept also applies to a polygonal moving track.

According to the present invention, a detection value of each cell is obtained during panel initialization as a reference value, and the reference value is subtracted from a subsequently obtained detection value for each cell as a new detection value before the above-mentioned determination requirements. For example, a reference value for a specified touch cell is 3000, and any subsequently obtained detection value needs to be deducted by 3000 for the following determinations. If the subsequently obtained value is 3100, the new detection value is 3100−3000=100 for the following determinations.

According to the present invention, a stable range for the new detection value is set. A compensation value is subtracted from the new detection value and the compensation value is added to the reference value if the new detection value is higher than an upper limit of the stable range when there is no touch event. The compensation value is added to the new detection value and the compensation value is subtracted from the reference value if the new detection value is lower than a lower limit of the stable range. The upper limit and lower limit of the stable range depend on the characteristics of the touch panel and the magnitudes of the noises. For example, when the touch panel is subject to general noise interference without any touch, the detection values will vary between 20 and −20. Thus, the upper limit are lower limit of the stable range can be set to 30 and −30, respectively while the compensation value is set to 6. When there is no touch event, if the new detection value is 35, greater than the upper limit (30) of the stable range, then the new detection value will be deducted by 6, i.e., 29, and the compensation value will be added to the reference value, making new detection value generated afterwards remain 29, which is within the stable range.

According to the present invention, if there is an insulation touch point, the above addition and subtraction operations can be ignored. It is because the detection values for glove touch are already much smaller than those for finger touch. The detection values may be maintained within the stable range by the operations of adding and/or subtracting the compensation value. Even for glove touch, the detection values cannot be greater than the effective touch standard value, and thus the touch panel will not enter the insulation mode. Therefore, when there is an insulation touch point, the above addition and subtraction operations can be ignored to avoid misjudgment.

The above description is directed to determination for entering the insulation mode from the normal mode. Next, determining touch effect when the touch panel is in the insulation mode will be described. In the insulation mode, the detection values are enhanced and effective touch is determined based on the normal touch threshold as the effective touch standard value, or effective touch is determined directly based on the insulation touch threshold as the effective touch standard value. For example, according to the above data, the detection values for finger touch are 10 times the detection values for glove touch. Therefore, in the insulation mode, the detection values are multiplied by 10, and then the normal touch threshold of 400 is used as the effective touch standard value or the insulation touch threshold of 90 is used as the effective touch standard value for determining effective touch.

According to the present invention, when whether a cell at an edge of the touch panel is effectively touched is determined, detection value of the cell at the edge can be enhanced, or the effective touch standard value can be reduced for determining effective touch. This is because detection values of cells at edges of a touch panel are usually smaller than detection values of central cells. Therefore, the touch determination criteria for the edges of the panel are lowered to avoid no response when the edges of the panel are touched by a glove.

According to the present invention, whether a cell with detection value greater than the effective touch standard value is effectively touched can be determined based on detection values of adjacent upper, lower, left, and right cells. This is because, for glove touch, contact area is usually large enough, and thus the detection values of adjacent upper, lower, left, and right cells are also considered. For example, for effective touch, the detection values of the adjacent cells must be greater than a certain standard value, or the sum of the detection values of the adjacent cells must be greater than another standard value.

Figure 5A:
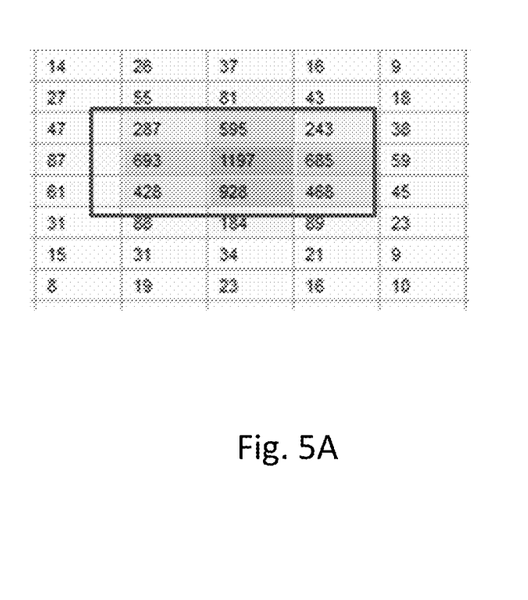
FIG. 5A and FIG. 5B illustrate detection value sampling ranges for calculating touch coordinates in normal mode and in insulation mode, respectively.
Figure 5B:
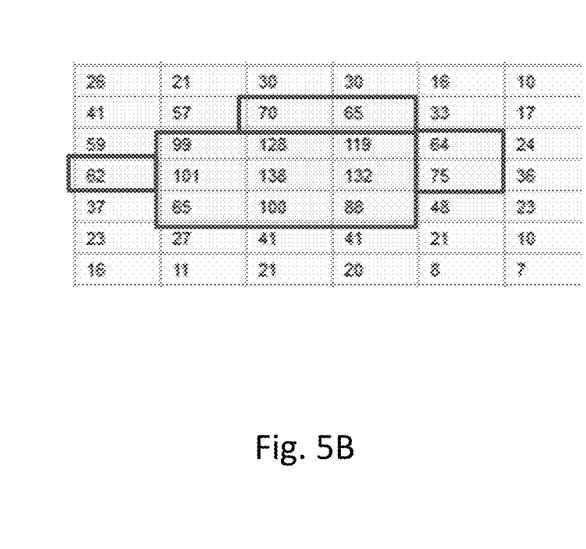

According to the present invention, an area where detection values are greater than a detection range standard value is located based on cells with detection values greater than the effective touch standard value after an effective touch point is determined in the insulation mode. Touch coordinates are calculated based on the detection values in the area. As shown in FIG. 5A, for finger touch, detection values of a touch cell and eight surrounding cells are used to calculate the touch coordinates. However, as shown in FIG. 5B, since the contact area for glove touch is larger, the nine cells in FIG. 5A are not enough, and there are several cells having detection values close to the maximum values. For example, the maximum detection value in FIG. 5B is 138, and the detection value of the adjacent right cell is 132. If a noise changes the detection value of 132 to 139, which is higher than the original maximum value, the nine-cell zone will be moved to next columns. Hence, the calculation for the touch coordinates is unstable. It is better to locate a detection region before coordinate calculation. For example, a region having detection values higher than 60 (detection range standard value) is located and the detection values of all 14 cells in the region shown in FIG. 5B are used for coordinate calculation, which is more stable.

In the touch coordinate calculation mentioned above, the coordinates can be further stabilized by filtering, averaging, stable processing, or deceleration. Filtering is applied to a present detection value of a touch cell with reference to previous detection values thereof, or to present touch coordinates with reference to previous touch coordinates thereof. Averaging is to average detection values of respective touch cells or touch coordinates. As to stable processing, please refer to Applicant's U.S. patent application Ser. No. 16/460,516, titled "Analog-to-Digital Converter with Adjustable Operation Frequency for Noise Reduction" in which when a value varies dramatically, reducing the variation to stabilize an output value can be used to stabilize detection values of respective touch cells or touch coordinates. Deceleration is to reduce reporting rate. In the normal mode, for example, 100 touch coordinates are calculated and outputted every second. However, since the insulation mode can be easily subject to noise interference, only 50 touch coordinates are calculated and outputted every second to reduce noise interference.

The above description is directed to determination for entering the insulation mode from the normal mode and to determination of touch effect in the insulation mode. Next, determination for returning to the normal mode from the insulation mode will be described. The touch panel returns to the normal mode from the insulation mode after a period of holding time without any touch event. The period of time can be set to 3 seconds. If the touch panel has not been touched in 3 seconds by a finger or a glove, it will automatically return to the normal mode from the insulation mode.

According to the present invention, the touch panel leaves the insulation mode if any one of the detection values of the touch cells is greater than a normal detection standard value. The insulation mode is an operation mode for glove touch, and thus the detection values thereof are less than those for finger touch. As shown in FIG. 5B, the maximum detection value is only 138. If there is a detection value higher than the normal detection standard value of 400, it would be determined that the touch panel is touched by a finger. Then it will automatically return to the normal mode from the insulation mode.

According to the present invention, if the touch panel leaves the insulation mode because any one of the detection values of the touch cells is greater than a normal detection standard value, then the touch panel can enter the insulation mode directly without repeating the above determination requirements when the touch event disappears or the detection values of the touch cells are less than an insulation restoration standard value. The design is because after the touch panel returns to the normal mode from the insulation mode due to finger touch, it can automatically get back to the insulation mode once the finger does not contact with the panel. In such a case, either a finger or a gloved finger can operate the touch panel directly. If the touch panel does not return to the insulation mode, a lot of efforts are needed to determine glove touch before the glove mode (insulation mode) is chosen, which is very inconvenient. In addition, the insulation restoration standard value can be equal to the normal detection standard value of 400, or less than the normal detection standard value to form a buffering range to avoid frequent transitions between the normal mode and the insulation mode. However, it should be higher than the insulation touch threshold (i.e., 90).

Figure 6:
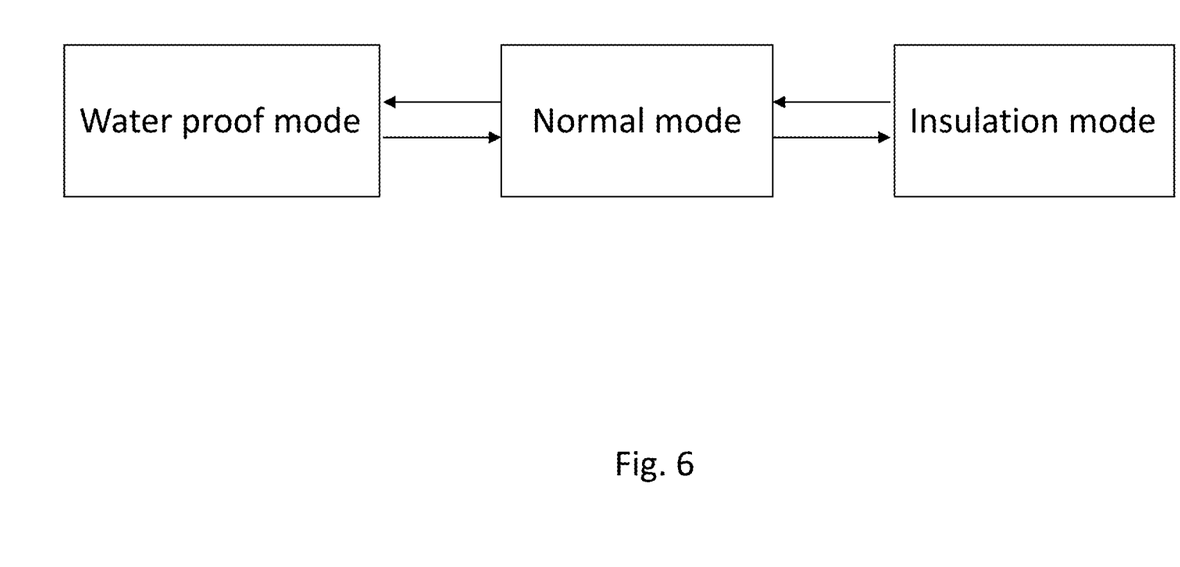
FIG. 6 is a view showing normal mode, insulation mode and waterproof mode provided in a touch panel.

In addition to the normal mode and the insulation mode, the touch panel is further provided with other modes. The touch panel enters the insulation mode or the other modes from the normal mode based on the above determination requirements or other conditions for the other modes. The other modes of the touch panel include a waterproof mode, as shown in FIG. 6. As to determination of entering and leaving the waterproof mode and determination of touch effect in the waterproof mode, please refer to Applicant's U.S. patent application Ser. No. 16/711,526, titled "Multiple-Mode Operation Method for Capacitive Touch Panel".

Figure 7:
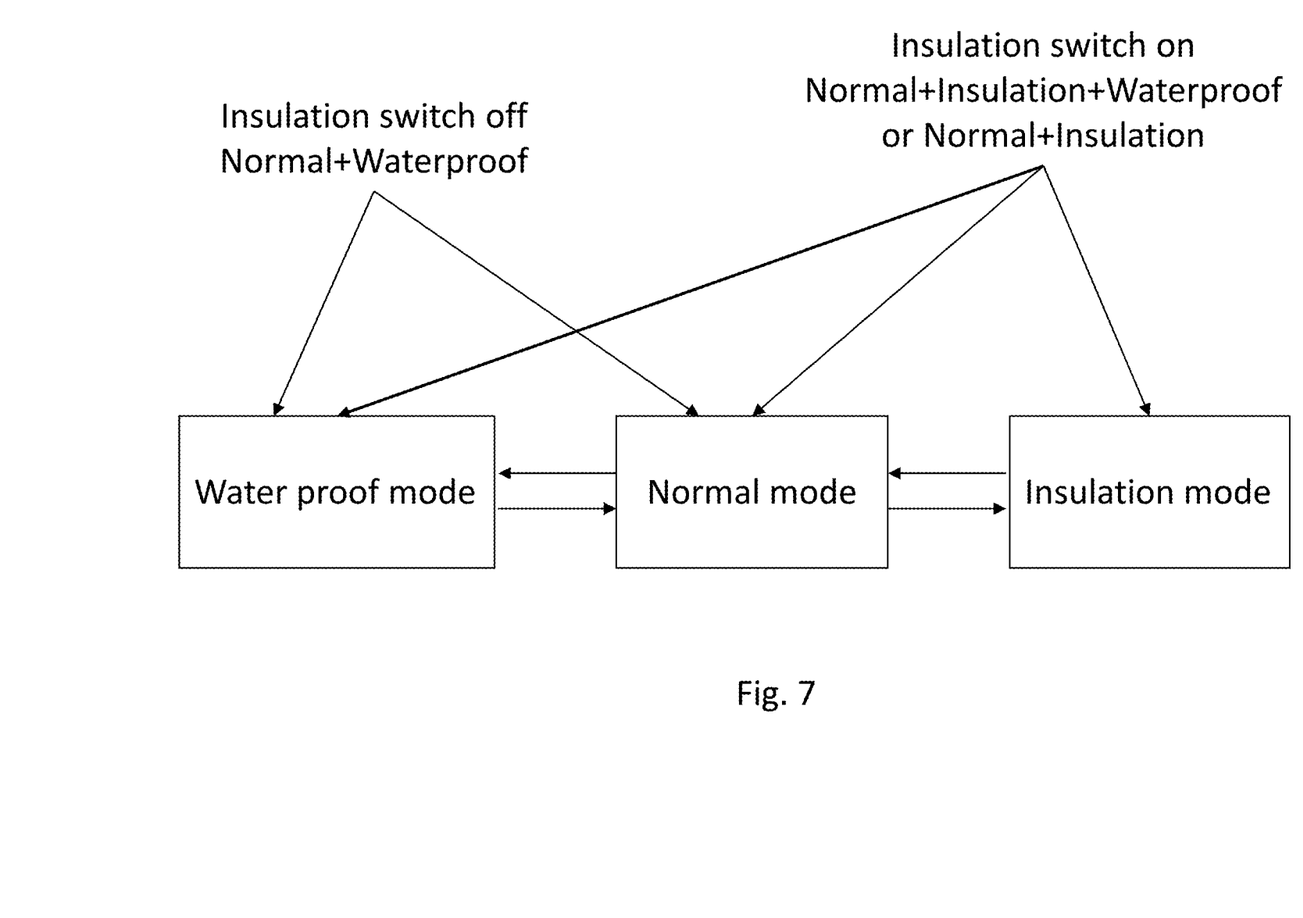
FIG. 7 is a view showing normal mode, insulation mode and waterproof mode provided in a touch panel having an insulation switch.

The touch panel of the present invention includes an insulation switch. When the insulation switch is turned off, the touch panel is restricted to the normal mode or the other modes, excluding the insulation mode. When the insulation switch is turned on, the touch panel can enter the normal mode, the insulation mode or the waterproof mode, or is restricted to only the normal mode or the insulation mode, as shown in FIG. 7. There are three options as follows. Firstly, when the insulation switch is always on, the touch panel can enter the normal mode, the insulation mode or the waterproof mode. Secondly, when the insulation switch is turned on, the touch panel can enter the normal mode, the insulation mode or the waterproof mode, and when the insulation switch is turned off, the touch panel can enter only the normal mode or the waterproof mode. Thirdly, when the insulation switch is turned on, the touch panel can enter only the normal mode or the insulation mode, and when the insulation switch is turned off, the touch panel can enter only the normal mode or the waterproof mode.

According to the present invention, the above insulation determination requirements are omitted when the touch panel is restricted to only the normal mode or the insulation mode.

Figure 8:
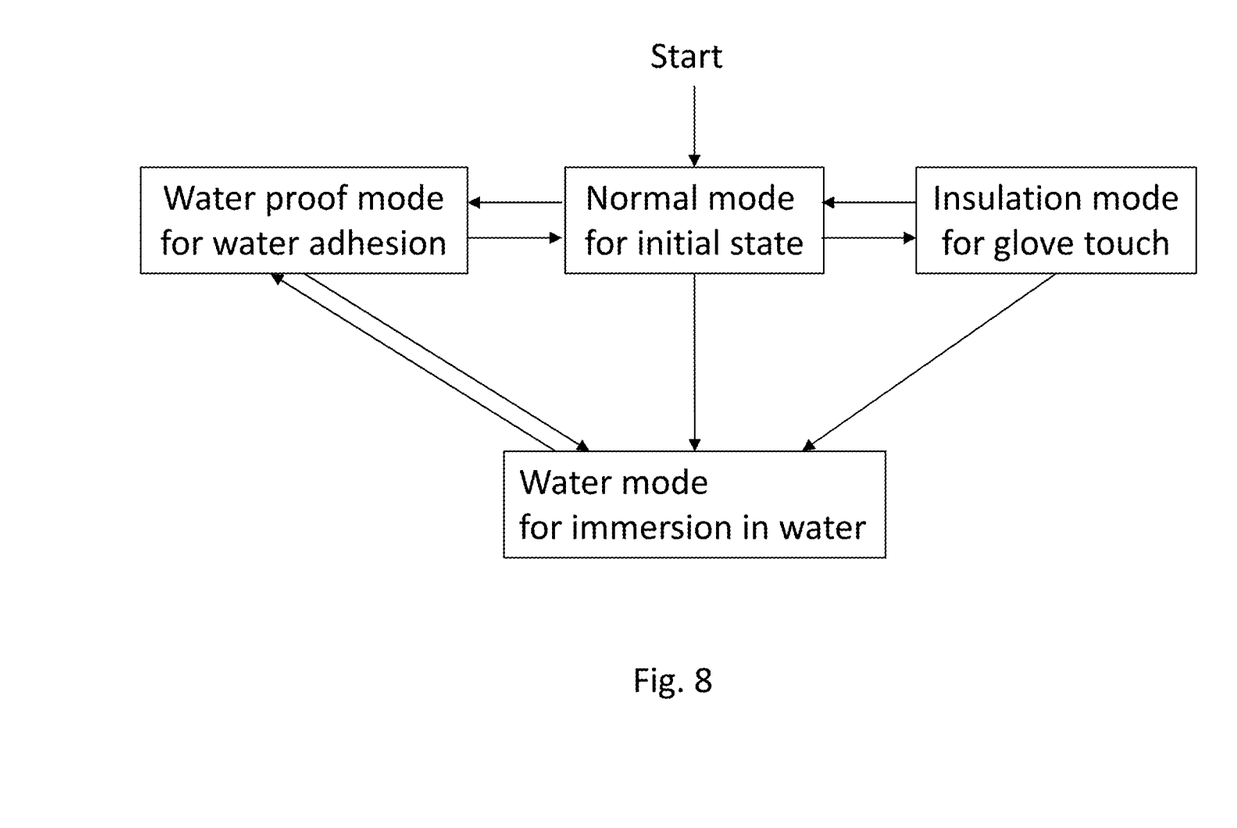
FIG. 8 illustrates the touch panel according to the present invention has a normal mode, an insulation mode, a waterproof mode and a water mode.

The other modes of the touch panel include a water mode, as shown in FIG. 8. The touch panel can enter the insulation mode, the waterproof mode, or the water mode from the normal mode. Besides, the touch panel can enter the water mode from the insulation mode or the waterproof mode. In addition, the touch panel is limited to entering the waterproof mode from the water mode. With respect to the water mode and determination of leaving the water mode, please refer to Applicant's U.S. patent application Ser. No. 16/711,526, titled "Multiple-Mode Operation Method for Capacitive Touch Panel". The other operation modes, such as waterproof mode and water mode, can recognize normal finger touch, glove touch, finger touch when the panel is in contact with water, and finger touch when the panel is immersed in water.

The apparatus according to the present invention includes a processing unit, a memory and a touch panel, and it can be implemented with the aid of firmware, software or combination thereof.

Figure 9:
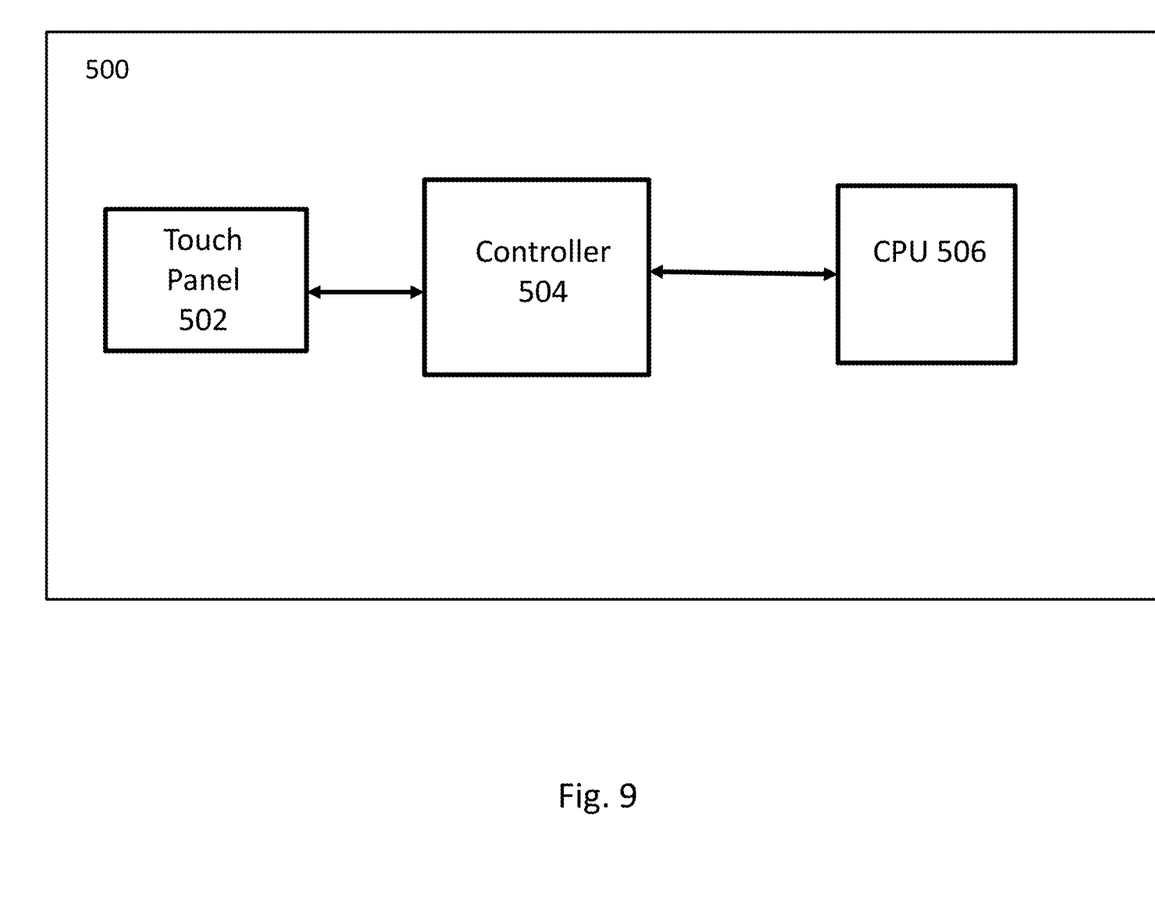
FIG. 9 is a block diagram showing a calculation apparatus according to an embodiment of the present invention.

FIG. 9 is a block diagram showing a calculation apparatus 500 in accordance with an embodiment of the present invention. As shown, the calculation apparatus 500 includes a touch panel 502, a controller 504, and a central processing unit 506. The touch panel 502 is used for displaying and allowing a user to operate by means of finger touch. The controller 504 can obtain an input signal from the touch panel 502 and cooperate with the central processing unit 506 to perform at least one of the above-mentioned modes of the present invention according to the input signal. The calculation apparatus 500 is capable of performing waterproof mode and/or insulation mode processing of the present invention with high touch point accuracy.

While the invention has been described in terms of what is presently considered to be the most practical and preferred embodiments, it is to be understood that the invention needs not be limited to the disclosed embodiments. For example, alphanumeric labeling for the steps of the present invention is for the purpose of easy understanding. It is by no means to limit the sequence of the steps. On the contrary, it is intended to cover various modifications and similar arrangements included within the spirit and scope of the appended claims, which are to be accorded with the broadest interpretation so as to encompass all such modifications and similar structures.

What is claimed is:

1. A multi-mode operation method for a capacitive touch panel having a plurality of touch cells for obtaining a detection value from each of the plurality of touch cells in a mutual capacitance scanning manner, in which the panel is provided with a normal mode and an insulation mode, comprising the steps of:
   a) determining whether all detection values of the plurality of touch cells are less than a normal touch threshold;
   b) determining whether there is a touch cell with detection value greater than an insulation touch threshold; if positive, the insulation touch threshold being used as an effective touch standard value; otherwise, the detection values being enhanced to determine whether there is a touch cell with detection value larger than the normal touch threshold; if positive, the normal touch threshold being used as the effective touch standard value; determining whether detection values of upper, lower, left, and right cells adjacent to the touch cell are less than the detection value of the touch cell; and an insulation touch point being formed;
   c) determining whether the insulation touch point exists for a while and moves a distance greater than a predetermined distance, or whether the insulation touch point does not move but disappears in a short time and another insulation touch point appears near the disappeared insulation touch point; and
   d) entering the insulation mode.

2. The method according to claim 1, wherein all touch cells can have an insulation touch point at most or the detection values of all touch cells cannot be less than a lower threshold.

3. The method according to claim 1, wherein step c) comprises step c1) of restricting moving track of the insulation touch point to be a back and forth movement or a polygonal track when the moving distance of the insulation touch point is determined to be greater than the predetermined distance or not.

4. The method according to claim 1, further comprising steps of:
  e) obtaining detection value of each of the plurality of cells during panel initialization as a reference value; and
  f) subtracting the reference value from a subsequently obtained detection value for each of the plurality of cells as a new detection value before step a) is performed.

5. The method according to claim 4, further comprising steps of:
  g) setting a stable range for the new detection value; and
  h) subtracting a compensation value from the new detection value and adding the compensation value to the reference value if the new detection value is higher than an upper limit of the stable range when there is no touch event, or adding the compensation value to the new detection value and subtracting the compensation value from the reference value if the new detection value is lower than a lower limit of the stable range.

6. The method according to claim 5, further comprising step of:
  i) ignoring step h) if there is an insulation touch point.

7. The method according to claim 1, wherein in the insulation mode, the detection values are enhanced and effective touch is determined based on the normal touch threshold as the effective touch standard value, or effective touch is determined directly based on the insulation touch threshold as the effective touch standard value.

8. The method according to claim 7, wherein when whether a cell at an edge of the touch panel is effectively touched is determined, detection value of the cell at the edge can be enhanced, or the effective touch standard value can be reduced for determining effective touch.

9. The method according to claim 8, wherein whether a cell with detection value greater than the effective touch standard value is effectively touched can be determined based on detection values of adjacent upper, lower, left, and right cells.

10. The method according to claim 1, further comprising step j) of locating an area where detection values are greater than a detection range standard value based on cells with detection values greater than the effective touch standard value after an effective touch point is determined in the insulation mode, and calculating touch coordinates based on the detection values in the area.

11. The method according to claim 10, further comprising step k) of stabilizing the coordinates by filtering, averaging, stable processing, or deceleration.

12. The method according to claim 1, further comprising step l) of returning to the normal mode from the insulation mode after a period of holding time without any touch event.

13. The method according to claim 1, further comprising step m) of leaving the insulation mode if any one of the detection values of the plurality of touch cells is greater than a normal detection standard value.

14. The method according to claim 13, further comprising step n) of entering the insulation mode directly without repeating steps a) to c) when the touch event disappears or the detection values of the plurality of touch cells are less than an insulation restoration standard value if the insulation mode is left.

15. The method according to claim 1, wherein the touch panel is further provided with other modes and the touch panel enters the insulation mode or the other modes from the normal mode based on steps a) to c) or other conditions for the other modes.

16. The method according to claim 15, wherein the touch panel has an insulation switch; when the insulation switch is turned off, the touch panel is restricted to the normal mode or the other modes; when the insulation switch is turned on, the touch panel can enter the normal mode, the insulation mode or the other modes, or is restricted to only the normal mode or the insulation mode; and when the touch panel is restricted to only the normal mode or the insulation mode, steps a) to c) are omitted.

17. The method according to claim 15, wherein the other modes comprise a waterproof mode and a water mode; the touch panel can enter the insulation mode, the waterproof mode, or the water mode from the normal mode; the touch panel can enter the water mode from the insulation mode or the waterproof mode; and the touch panel is limited to entering the waterproof mode from the water mode.

18. A calculation apparatus, comprising:
  a central processing unit;
  a touch panel for allowing a user to touch; and
  a controller, in communication with the touch panel and the central processing unit, for determining a touch effect based on touch detection values;
  wherein the central processing unit and the controller collaboratively operate to perform the method according to claim 1.

* * * * *